United States Patent
Clemm et al.

(10) Patent No.: US 7,126,941 B1
(45) Date of Patent: Oct. 24, 2006

(54) MANAGING PACKET VOICE NETWORKS USING A VIRTUAL SWITCH APPROACH

(75) Inventors: L. Alexander Clemm, Cupertino, CA (US); Poon K. Leung, Saratoga, CA (US); Hector G. Trevino, Elizabeth, CO (US); Prakash Bettadapur, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 901 days.

(21) Appl. No.: 10/027,005

(22) Filed: Dec. 19, 2001

Related U.S. Application Data

(60) Provisional application No. 60/314,745, filed on Aug. 24, 2001.

(51) Int. Cl.
  *H04L 12/66* (2006.01)
  *H04L 12/28* (2006.01)
(52) U.S. Cl. ...................... 370/352; 370/254
(58) Field of Classification Search ............... 370/254, 370/255, 338, 401; 717/105; 716/14
See application file for complete search history.

(56) References Cited

U.S. PATENT DOCUMENTS

| | | | |
|---|---|---|---|
| 6,614,781 B1 * | 9/2003 | Elliott et al. | 370/352 |
| 6,680,952 B1 * | 1/2004 | Berg et al. | 370/467 |
| 2001/0003189 A1 * | 6/2001 | Miyazawa et al. | 709/206 |
| 2003/0035417 A1 * | 2/2003 | Zirojevic et al. | 370/357 |

OTHER PUBLICATIONS

M. Arango et al., "Media Gateway Control Protocol (MGCP), Version 1.0," IETF RFC 2705, Oct. 1999.
N. Greene et al., "Media Gateway Control Protocol Architecture and Requirements," IETF RFC 2805, Apr. 2000.
B. Foster, "MGCP CAS Packages," IETF RFC 3064, Feb. 2001.
A. Srinath et al., "MGCP Business Phone Packages," IETF RFC 3149, Sep. 2001.

\* cited by examiner

*Primary Examiner*—Steven Nguyen
(74) *Attorney, Agent, or Firm*—Hickman Palermo Truong & Becker LLP

(57) ABSTRACT

A method for managing packet voice networks using a virtual switch approach and abstract information model approach is disclosed. A virtual switch object represents a virtual switch having a media gateway controller and one or more associated media gateways. User input specifies a configuration operation on the virtual switch and one or more parameter values. One or more configuration instructions are automatically issued to both the media gateway controller and the media gateway, resulting in configuring both the media gateway controller and the media gateway as specified in the user input. As a result, a user can configure or operate on a virtual switch as an atomic entity, for example, in a network management application, without involvement in complicated details of the actual network devices that provide a particular packet voice service.

18 Claims, 11 Drawing Sheets

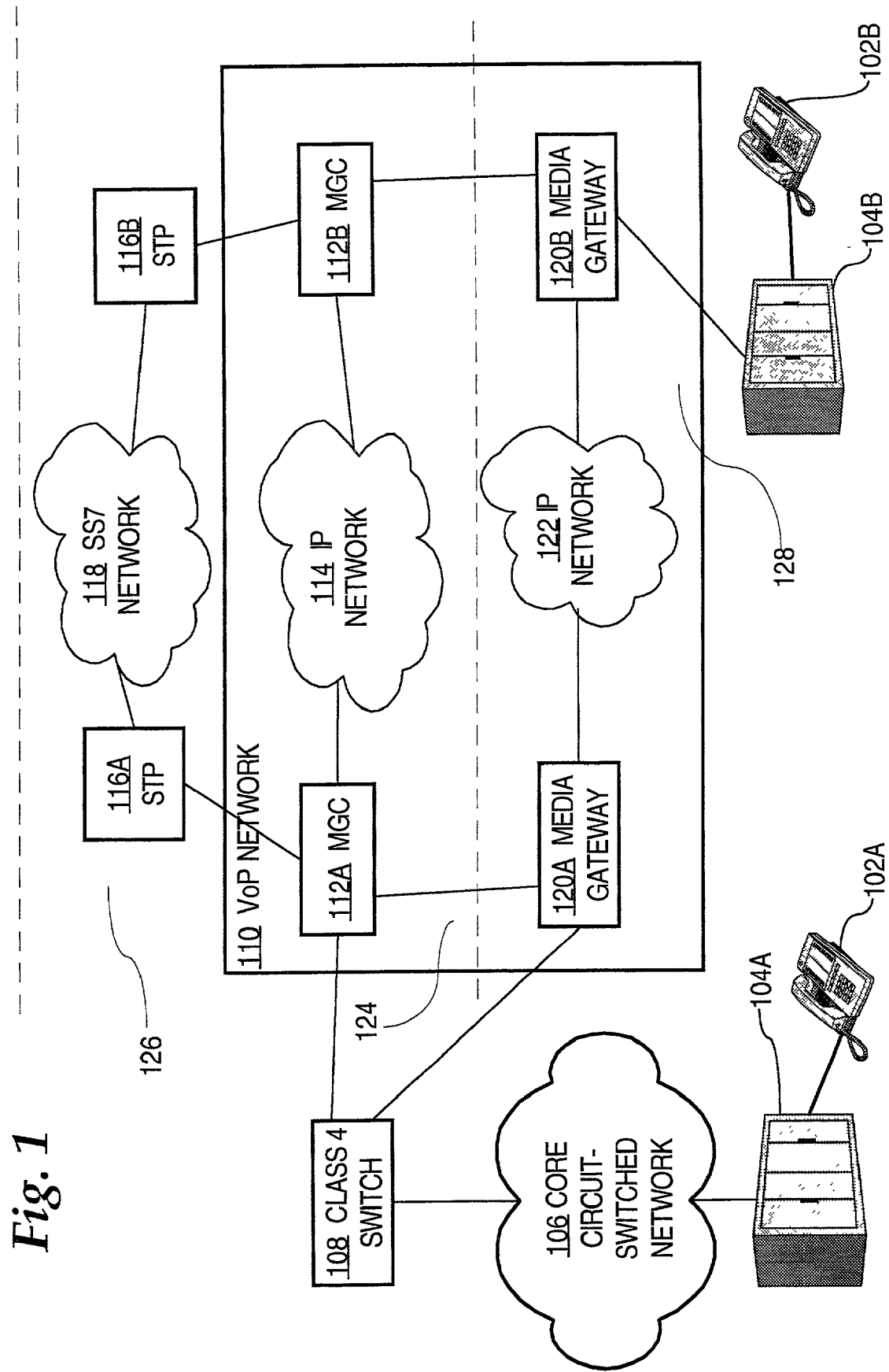

MANAGING PACKET VOICE NETWORKS USING A VIRTUAL SWITCH APPROACH

CROSS-REFERENCE TO RELATED APPLICATIONS; PRIORITY CLAIM

This application claims benefit of domestic priority from Provisional Appln. 60/314,745, filed Aug. 24, 2001, the entire contents of which is hereby incorporated by reference as if fully set forth herein, under 35 U.S.C. §119(e).

FIELD OF THE INVENTION

The present invention relates to managing packet-switched telecommunication networks that carry voice and telephone call information, and relates more specifically to managing such networks using a virtual switch approach and an abstract information model approach.

BACKGROUND OF THE INVENTION

Telecommunications service providers and equipment manufacturers are now rapidly developing and deploying packet-switched data communication networks that can carry voice and telephone call information, and that conform to published, non-proprietary engineering standards and protocols. Such "open packet telephony" ("OPT") networks allow for integrating multiple services, such as voice and data, on the same network, which results in a cost savings.

One class of OPT networks is based on the Media Gateway Control Protocol (MGCP) and its derivatives, such as SGCP, MeGaCo, H.248. Other OPT networks may be based on Session Initiation Protocol (SIP), and H.323. In general, OPT networks based on these protocols are designed such that individual networking devices store and process limited information about the network and its protocols ("intelligence") and hence place most of the intelligence that is required for voice services in gateway controllers. In contrast, in other classes of OPT networks, such as those based on the H.323 family of protocols, more intelligence is placed in the network as opposed to controllers. In general, in this document, the term "OPT networks" refers to MGCP-based networks.

Generally, in an OPT network, voice functionality is separated into different planes. A bearer plane and a switching plane communicate data packets between endpoints. Media Gateway ("MG") devices are located at the edge of the packet network and interface the packet network to other networks, such as the public switched telephony network. MGs provide facilities to transmit and receive data over the packet network, and convert data between the Time Division Multiplexed (TDM) format that is used in telephony networks, and the packetized voice payload format that is used in OPT networks. The signaling and control plane provides call intelligence, processing signaling, routing calls, interpreting dial plans, etc.

The signaling and control plane comprises one or more Media Gateway Controller (MGC) devices. MGCs instruct MGs through a control protocol such as MGCP to create, delete and modify voice connections. MGCs also terminate the signaling required for voice. In cases where signaling is physically connected to a Media Gateway, as with Primary Rate Interface or PRI, the signaling is backhauled between the MG and MGC. In this context, a "backhauled" signal is one that is transported from a MG to a MGC, because the MGC is the entity that possesses or controls the MG.

Although OPT networks provide cost savings, managing OPT networks is far more complex than managing the TDM switches that are found in conventional circuit-switched networks, which the OPT networks are replacing. With TDM switches, operators manage and interact with fewer devices, possibly even one device, although each device is complex. In contrast, operators of OPT networks are required to manage and interact with a significant number of devices and many different types of devices. In short, where operators previously had to manage one network element, operators now have to manage an entire network.

For example, configuration and provisioning of the devices in an OPT network must be coordinated. Configuration mismatches must be properly detected. Alarms between different devices must be correlated where different devices detect the same error condition and, therefore, generate redundant alarms. As a further complication, the common principles underlying the operation of the OPT network are generally not well understood, because operators and other users ("operators") tend to "think" in terms of boxes rather than in terms of general architecture. This increases costs and reduces profitability of service providers, as general operational complexity is increasing.

Further, how network management applications handle a problem is largely determined by how the application domain is modeled through data structures, program functions, and related processes. There is a need for modeling OPT networks in a way that simplifies dealing with such networks while addressing the unique properties of an OPT network. Current protocols and standards fail to address this need. In current approaches, network elements that represent MGs and MGCs are simply modeled and managed like any other network elements.

Distribution of functionality is one problem. Whereas TDM networks traditionally comprise monolithic network elements that hide much of their internal complexity, some of this complexity is now exposed, as functionality is distributed over several independent and cooperating components. Each component on its own is significantly simpler than a TDM switch, but the overall complexity of the network is higher, and it has a greater number and variety of components. Consistent provisioning of control elements as well as provided services can be a challenge because there is often a need to correctly configure multiple network elements.

Openness also results in management difficulty. Different components now provide functions that formerly were provided by the same TDM switch, and the different components may come from different vendors and may comprise different equipment types. There is a need for a way to accommodate future releases and implementations of MGs in a network management solution.

Flexibility also causes management challenges. Networks can have vastly different architectures. Central office equipment and customer premises equipment with different characteristics all may participate as MGs in the same virtual switch. The relationship between MGs and MGCs may vary over time.

Integration causes still other problems. A bearer network may carry services other than voice, which require management. A component acting as MG in a voice network may at the same time be part of a traditional data network. This introduces overlaps and dependencies between management domains, introducing additional complexity.

Based on the foregoing, there is a clear need in this field for improved methods to manage OPT networks and devices in them.

There is a particular need for an integrated network management solution for OPT networks MGCs and MGs are managed in a coordinated way.

There is also a need for a way for a solution that is operable in a way that is intuitive for an administrator or operator.

SUMMARY OF THE INVENTION

The foregoing needs, and other needs and objects that will become apparent for the following description, are achieved in the present invention, which comprises, in one aspect, a method for managing packet voice networks using a virtual switch approach and abstract information model approach. A virtual switch object represents a virtual switch having a media gateway controller and one or more associated media gateways. User input specifies a configuration operation on the virtual switch and one or more parameter values. One or more configuration instructions are automatically issued to both the media gateway controller and the media gateway, resulting in configuring both the media gateway controller and the media gateway as specified in the user input. As a result, a user can configure or operate on a virtual switch as an atomic entity, for example, in a network management application, without involvement in complicated details of the actual network devices that provide a particular packet voice service.

In particular, in one embodiment, techniques are provided for managing packet switched networks that carry voice and more specifically for managing such networks using a virtual switch information object and processes that use such objects. The virtual switch represents packet switched network elements, such as MGCs and MGs. A virtual switch can be manipulated in a way that is analogous to provisioning a TDM switch and its constituent elements. In response to modification of a virtual switch object, programmatic processes automatically issue configuration commands or take other required actions with respect to all actual physical and logical devices and interfaces that are represented by the virtual switch object. As a result, the work required by operators and the number of errors interjected by operators is reduced.

Virtual switch operations are provided for operating on the virtual switch objects in a manner analogous to provisioning a TDM switch. The virtual switch in conjunction with the virtual switch operations encapsulate and abstract the packet switched network elements and facilitate provisioning the packet switched network elements. Thus much of the underlying complexity of a packet switched network is hidden from users, which simplifies network management.

Discrepancy detection and validation are also supported. In one embodiment, processes are provided to validate that the components of a virtual entity are configured in a way consistent with network level configuration integrity rules. Such validation can occur, for example, when the management system synchronizes its information with the network. Further, embodiments allow for detection of "orphans," which are media gateways that are not associated with media gateway controllers, and do not participate in a virtual switch.

In other aspects, the invention encompasses a computer apparatus, a computer readable medium, and a carrier wave configured to carry out the foregoing steps.

Embodiments include a virtual switch useful with an OPT network based on the MGCP protocol are principally described. However, networks based on H.323 may use analogous concepts. In one such embodiment, virtual zones that encapsulate gateway and gatekeeper combinations are provided, and virtual SS7 gateways that encapsulate combinations of gateways and signaling controllers are provided. Other embodiments that provide route servers with gatekeepers are contemplated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of an example of an open packet telephony network;

DETAILED DESCRIPTION OF THE PREFERRED EMBODIMENT

Figure 2A:
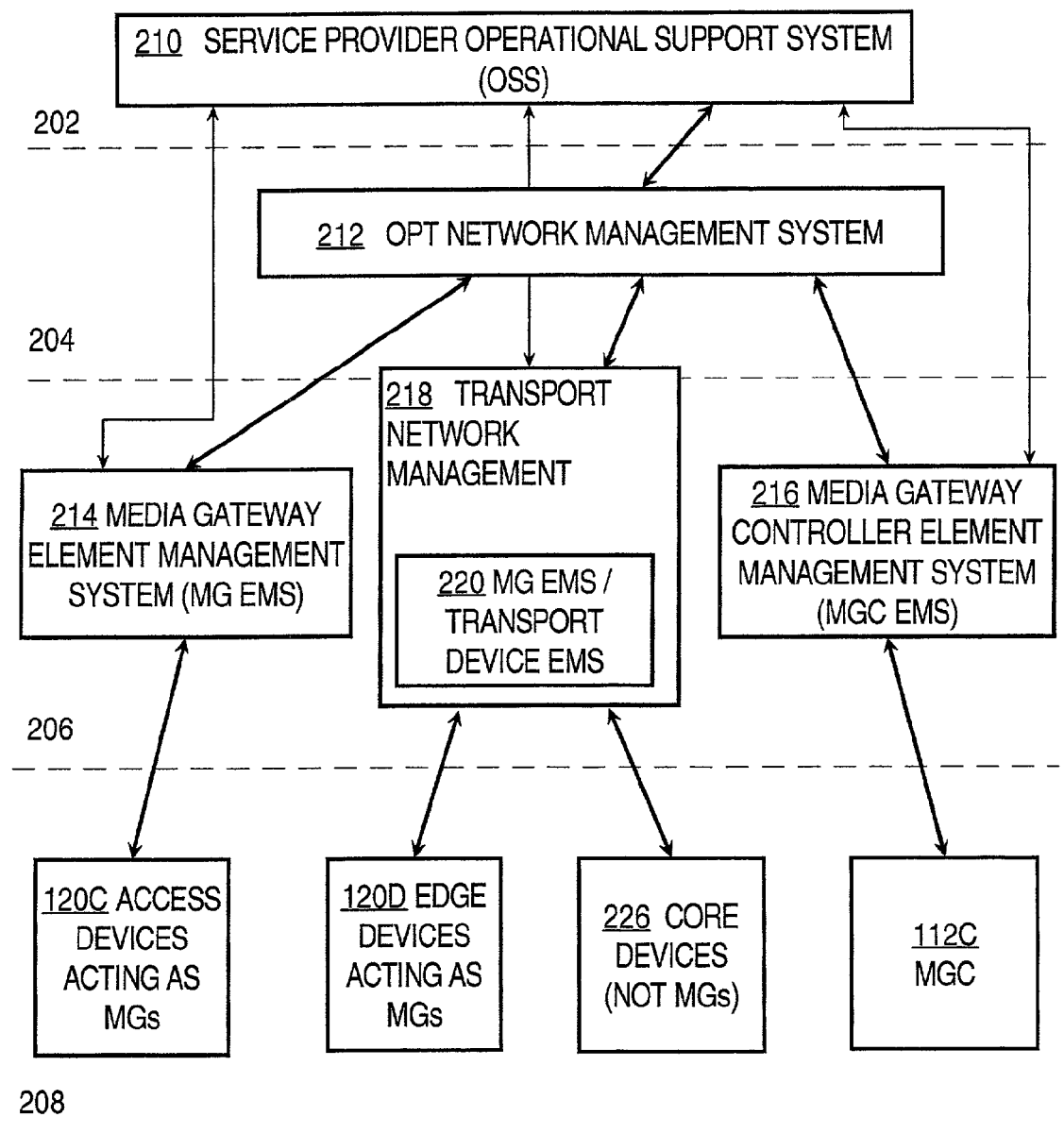
FIG. 2A is a block diagram of an OPT network management system and its relationship to other logical elements of a network management system.

A method for managing packet voice networks using a virtual switch approach and abstract information model approach is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For purposes of illustrating clear examples, the description herein generally relates to networks that are based on MGCP-type protocols. However, embodiments are not limited to such a context, and embodiments are applicable to H.323 and SIP-based networks. For example, embodiments described herein include a virtual switch useful with an OPT network based on the MGCP protocol are principally described. However, networks based on H.323 may use analogous concepts. In one such embodiment, virtual zones that encapsulate gateway and gatekeeper combinations are provided, and virtual SS7 gateways that encapsulate combinations of gateways and signaling controllers are provided. Other embodiments that provide route servers with gatekeepers are contemplated.

TECHNICAL OVERVIEW

Open packet telephony (OPT) networks based on Voice over Packet (VoP) technology are making inroads into the infrastructure of voice carriers. OPT networks enable service providers to offer telephony integrated with other services in a cost-effective way. Although several different OPT architectures exist, some have shared characteristics. For example, in general, OPT networks provide a bearer plane that deals with transport of voice payload data, and a separate control plane is responsible for signaling and provides "intelligence" in the network. Separation of the bearer plane and control plane enables other services to share the bearer plane, which services are controlled through their own control planes. Thus, multiple services can use the same transport mechanism with separate control mechanisms.

Separation of bearer and control planes also allows for flexibility in the design of OPT networks and enables integrated services to be provided by different components of different vendors. Because functions can be distributed across such components, the components tend to have less complexity individually and wider applicability, providing cost advantages. Further, service providers can differentiate themselves by creating networks in different ways to address different services and service characteristics.

However, network management is less well-developed in the context of OPT networks. Distribution of functionality across separate and heterogeneous components of multiple vendors increases the management complexity of the resulting networks. Further, whereas TDM switches in conventional networks had closed and proprietary interfaces not available for management manipulation, OPT network elements have open interfaces that are often exposed to management. As a result, there is an increasing need for management solutions, and the management problem is also more complex.

Effective management solutions are possible only with a thorough understanding of the unique aspects of OPT networks and how they impact management. However, service providers generally expect management solutions for OPT networks to fit in seamlessly with existing operations support structures and systems. Therefore, there is a need for a way to hide much of the underlying complexity of OPT networks from the operator.

FIG. 1 is a block diagram of an example of an open packet telephony network that is based on MGCP/H.248. First and second telephones 102A, 102B are communicatively coupled to respective private branch exchange (PBX) devices 104A, 104B. A first PBX 104A is communicatively coupled to a core circuit-switched network 106, which internally comprises one or more conventional TDM telephony switches in, for example, the public switched telephone network (PSTN) of an incumbent local exchange carrier (ILEC). At an edge point of the PSTN, such as at a telephone company office (CO), resides a class 4 switch 108 that is communicatively coupled to the network 106 and to a first media gateway controller 112A in a voice over packet network 110. The MGC 112A is communicatively coupled to an Internet Protocol (IP) network 114 that is coupled to a second MGC 112B at another point. Collectively MGC 112A, 112B and IP network 114 form a signaling and control plane 124 of the VoP network 110.

A signaling and control plane 126 that lies logically outside the VoP network comprises first and second signaling transfer points (STPs) 116A, 116B, which are communicatively coupled to an SS7 switching network 118. These elements cooperate to provide signaling and control functions in the VoP network 110. For example, MGC 112A can backhaul certain signaling and control signals that cannot traverse IP network 114 through STP 116A, SS7 network 118, and STP 116B to reach MGC 112B.

A bearer plane 128 of VoP network 110 comprises first and second media gateways (MGs) 120A, 120B that are communicatively coupled to a second IP network 122. Alternatively, network 122 may be an ATM network that comprises one or more ATM switches. Networks 114, 122 may overlap or constitute the same network. A first MG 120A is communicatively coupled to class 4 switch 108 and to a corresponding first MGC 112A that controls it. The second MG 120B is coupled to a corresponding MGC 1112B that controls it. The second MGC 120B is further coupled to the second PBX 104B.

In one embodiment, each MG may comprise one or more Cisco MGX 8260 devices from Cisco Systems, Inc., San Jose, Calif., which may be coupled by DS3 connections to the PSTN of the ILEC. One such device, or a redundant pair, is typically used. Each MG may also have a DS3 connection to a PSTN of a competitive local exchange carrier (CLEC) and a DS3 or primary rate interface (PRI) connection to a service provider network. Each MGC may comprise the combination of redundant Sun Microsystems Netra servers, Cisco VSC3000 Virtual Switch Controller software, two or more Cisco Catalyst 5500 switches that control call routing through the networks and that are interconnected through the MG, and two or more Cisco 2600 routers that function as Signaling Link Terminators (SLTs) for termination of SS7 links from the ILEC network. In this arrangement, a LAN is implemented between the MGC components consisting of a fast Ethernet cross-connection between the Catalyst 5500 switches and an SS7 backhaul connection over IP between the switches and the routers. The Cisco VSC3300 software controls the network and also controls interaction between the SS7 network and the MG. The term "virtual switch" as used in the label "Cisco VSC3300 software" is distinct from the term "virtual switch" as used in this disclosure.

In this arrangement, a call placed from telephone 102A is switched through PBX 104A, network 106, and class 4 switch 108 to MG 120A, where voice signals from telephone 102A are packetized. The packetized voice data passes through IP network 122 to MG 120B, which converts the packetized voice data back to TDM voice data that PBX 104B can carry to telephone 102B. These functions occur under the control of MGC 112A, 112B. As a result, a party at telephone 102A can hold a voice conversation with a party at telephone 102B, and the conversation is substantially carried in packetized digital form over IP network 122.

The network arrangement of FIG. 1 is provided as an example. Many variations are possible that share a common set of technical principles, namely the separation of bearer processing from signaling and control into distinct planes, and the introduction of open interfaces among the planes.

In general, bearer plane 128 is responsible for the transport of actual voice data (packet "payload"). Bearer plane 128 can use different protocols, such as IP or ATM and various adaptation layers. Network elements within the bearer plane are not concerned with the specifics of telephony applications. The bearer plane 128 may comprise a conventional IP or ATM network with IP routers or ATM switches, respectively. Media gateways 120A, 120B reside at the edge of the bearer plane; for example, the MGs 120A, 120B can be located at the carrier's central office, or they can be customer premises equipment (CPE). Bearer traffic enters the VoP network 110 through MGs 120A, 120B. Further, in networks that interconnect packet and TDM networks, MGs normally provide for conversion of TDM voice data to packet data and the converse. Switches or routers in network 122 provide a bearer fabric or "data cloud" that moves data packets among endpoints.

The Multiservice Switching Forum (MSF), an industry consortium, further divides bearer plane 128 into an adaptation plane and a switching plane. The switching plane deals with data transport, while the adaptation plane deals with the conversion of voice and adaptation of control functions to the specific bearer medium used. Functions of both the switching plane and adaptation plane can be implemented in the same physical device, under MSF guidelines.

Control plane 124 is responsible for signaling processing and call control and contains call processing intelligence in the form of MGCs 112A, 112B. The MGCs 112A, 1121B control corresponding MGs 120A, 120B by instructing them when to set up or tear down connections, requesting notification of specific events for further processing, etc. MGCs 112A, 112B contain all programmatic logic required for telephony applications, including SS7 signaling termination, directory functions, and the collection of accounting information. The MSF further defines an application plane on top of the control plane, an understanding of which is not pertinent to the present disclosure.

Collectively, the bearer plane and control plane provide functionality that is analogous to that of conventional PSTN switches. Therefore, a set of one or more MGs and one or more associated MGCs are referred to herein as a "virtual switch." The term "virtual switch" as used herein differs from a similar term, "soft switch," which is sometimes used in the industry to refer to a MGC but does not include an associated MG.

Communication between the bearer plane 128 and control plane 124 in general, and between an MG 120A, 120B and a corresponding MGC 112A, 112B in particular, involves call control functions, signaling backhaul functions, and resource coordination functions. Call control functions involve proper allocation of network resources to calls, such as setting up and tearing down connections, or connection up-speeding for fax calls. Call control also involves creating records of the use of network resources that may be used as a basis for creating call data records that are used in billing services of the network provider.

Signaling backhaul relates to termination of signals. In general, signaling terminates at an MGC and not at an MG. In arrangements where signaling is physically connected through a line of the MG, e.g., channel associated signaling or primary rate interfaces, lower signaling layers such as Layer 2 are terminated at the MG. However, Layer 3 signals are backhauled to the MGC.

Resource coordination involves communicating information about the bearer plane components to the control plane, and information about the control plane components to the bearer plane. For example, the MGC is informed of certain properties of the MG, such as the available endpoints or their state. Resource coordination allows MGC and MG to directly exchange this information without requiring external provisioning.

Interfaces for the foregoing functions can be provided through one or several control protocols. For example, MGCP provides for call control and also can be used to an extent for signaling backhaul and aspects of resource coordination. Stream control transmission protocol (SCTP) may be used for signaling backhaul.

FIG. 2A is a block diagram of an OPT network management system and its relationship to other logical elements of a network management system. The arrangement of FIG. 2A generally comprises a service management layer 202, network management layer 204, element management layer 206, and network element layer 208.

Network element layer 208 represents the logical position of network devices in a network. Network element layer 208 may comprise, for example, one or more access devices acting as media gateways 120C; one or more edge devices acting as media gateways 120D; one or more core devices 226, which do not act as MGs; and one or more media controllers 112C.

Element management layer 206 comprises components that manage elements in network element layer 208. Typically, the components of element management layer 206 comprise software application programs that are executed on workstations that are communicatively coupled to the elements of layer 208 or to a network in which they participate. In one example arrangement, layer 206 comprises a media gateway element management system 214 that manages MGs; a transport network management system 218 that manages edge devices 120D and core devices 226; and a media gateway controller element management system 216 that manages MGC 112C.

Service management layer 202 comprises an operational support system (OSS) that provides supervisory level control of the MG EMS 214, transport network management system 218, and the MGC EMS 216. Known OSS solutions from, for example, Telcordia or other vendors provide service order entry, service definition, and service provisioning functions.

Historically no commercial products have provided functionality for network management layer 204. In an embodiment, however, an OPT network management system 212 is placed in network management layer 204 and includes, among other elements, a virtual switch view and one or more virtual switch objects. The virtual switch view provides configuration management functions and may be used for other functions. OPT network management system 212 is configured in a highly scalable manner because it provides a single, overall management entry point into the OPT network. For example, flow-through interfaces are provided to enable programmatic functions of components of layer 206 to access the OSS 210. Further, an interface to an element management system is not required. For example, in environments in which no element management system is available, it is still possible for OPT network management system 212 to reach devices and have them under the scope of the OPT network management system by interfacing to a configuration delivery and retrieval engine, or by interfacing directly to the devices.

Figure 2B:
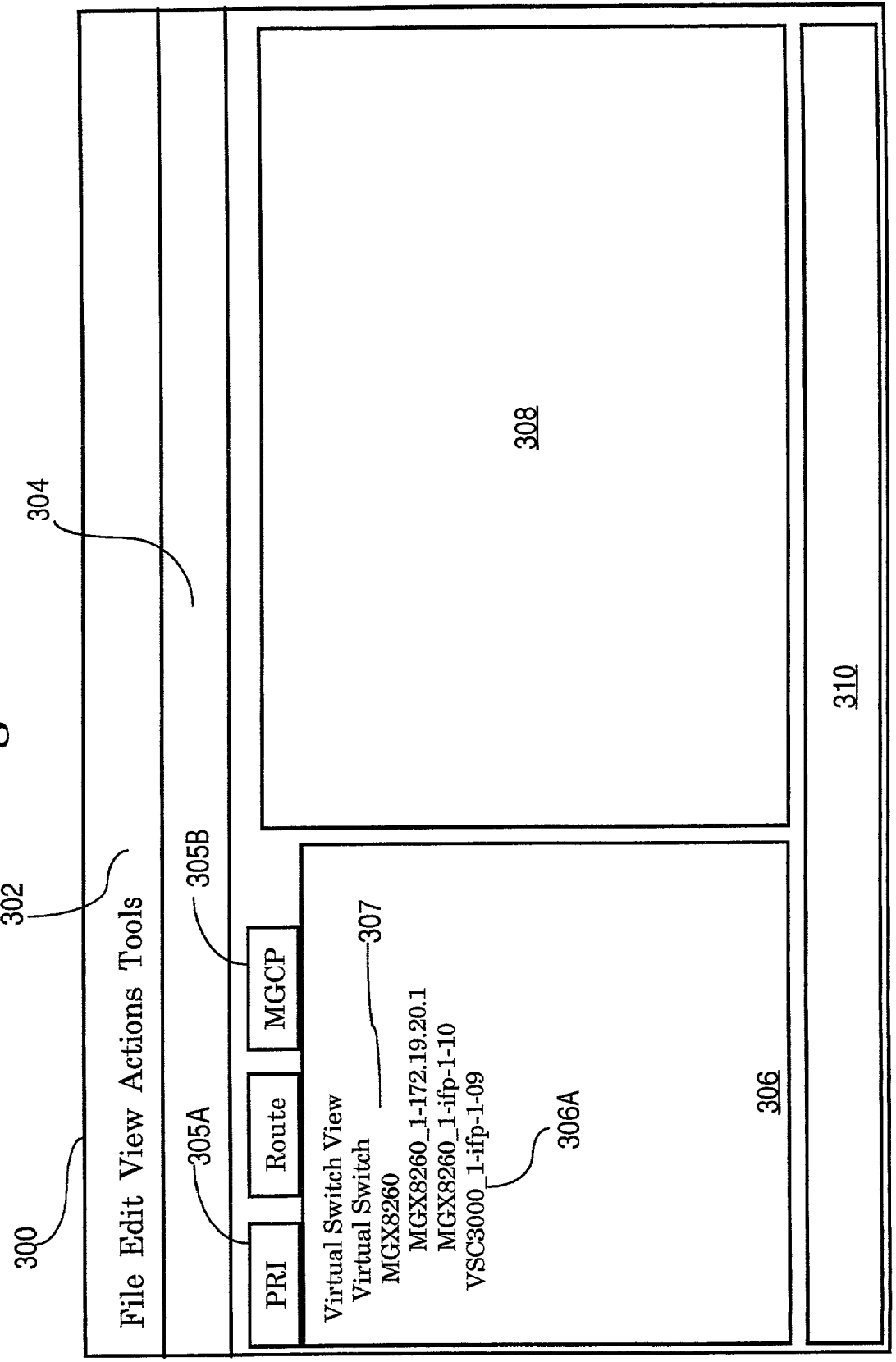
FIG. 2B is a block diagram of a graphical user interface that may be generated in an embodiment.

FIG. 2B is a block diagram of a graphical user interface that may be generated in an embodiment. OPT network management system 212 may provide a graphical user interface (GUI) for facilitating human interaction with its functions. In one embodiment, a GUI 300 comprises a menu bar 302, toolbar 304, view tabs 305A, 305B, a tree view 306 that includes a tree 306A of one or more virtual objects, network topology map area 308 with sub-maps, and object holding area 310.

A detailed description of an example embodiment of a GUI is also provided in pp. 33–163 of the above-referenced Provisional application.

In these embodiments, operations on the constituent elements of a virtual switch may be carried out by selecting one of the view tabs 305A, 305B or functions in toolbar 304. In response, OPT network management system 212 displays appropriate information or data entry fields in map area 308. A user may graphically drag virtual objects from tree view 306 and drop the objects in map area 308 in order to provide certain kinds of user input. For example, adding a PRI backhaul connection to a virtual switch may involve dragging an icon representation of a virtual switch from tree view 306 and dropping the icon in map area 308 in a specified data entry field, then providing one or more parameter values.

Other specific GUI operations are described herein with reference to FIGS. 5A–5D. Use of a GUI is not essential to an embodiment. A GUI merely represents one example framework that may be used to manipulate virtual switch objects. In other embodiments, virtual switch objects may be manipulated programmatically through an appropriate API or other interface. Such an API may include function calls that provide the operations described herein that act upon virtual switches as atomic objects.

Virtual Switch Information Model

According to one embodiment, a virtual switch information model is provided. The virtual switch information model includes a virtual switch object and supporting objects in the form of one or more classes that are defined using an object-oriented programming language. The virtual switch object model encapsulates OPT network elements, such as MGCs and MGs. Virtual switch operations are provided in the information model for operating on a virtual switch, encapsulating individual operations that are to be sent to the network elements that underlie the other objects that it comprises. Network operators can manipulate one or more virtual switch objects using graphical representations of them that are displayed by a network management application, such as OPT network management system 212. In response, the network management application carries out operations on the actual OPT network elements that are encapsulated by the virtual switch. Thus, network operators can indirectly manipulate OPT network elements in a manner that is analogous to conventional manipulation of TDM components by using the virtual switch, without having to deal with details of the OPT network elements. As a result, the work required by operators, and the number of errors interjected by operator actions, are reduced.

According to one embodiment, a virtual switch encapsulates functions of MGs, MGCs and control communications between the MGs and MGCs. For example, a virtual switch object may represent an MGC, or a collection of MGCs backing each other up for reliability reasons; a set of MGs that are controlled by the MGC; and control connectivity between them, including control communications and transport connections necessary to carry the control protocols.

Numerous network management applications can use a virtual switch. For the purpose of illustrating an example, the description herein focuses on a configuration management application. However, embodiments are not limited to this context, and can be used in other areas of OPT management.

Figure 3:
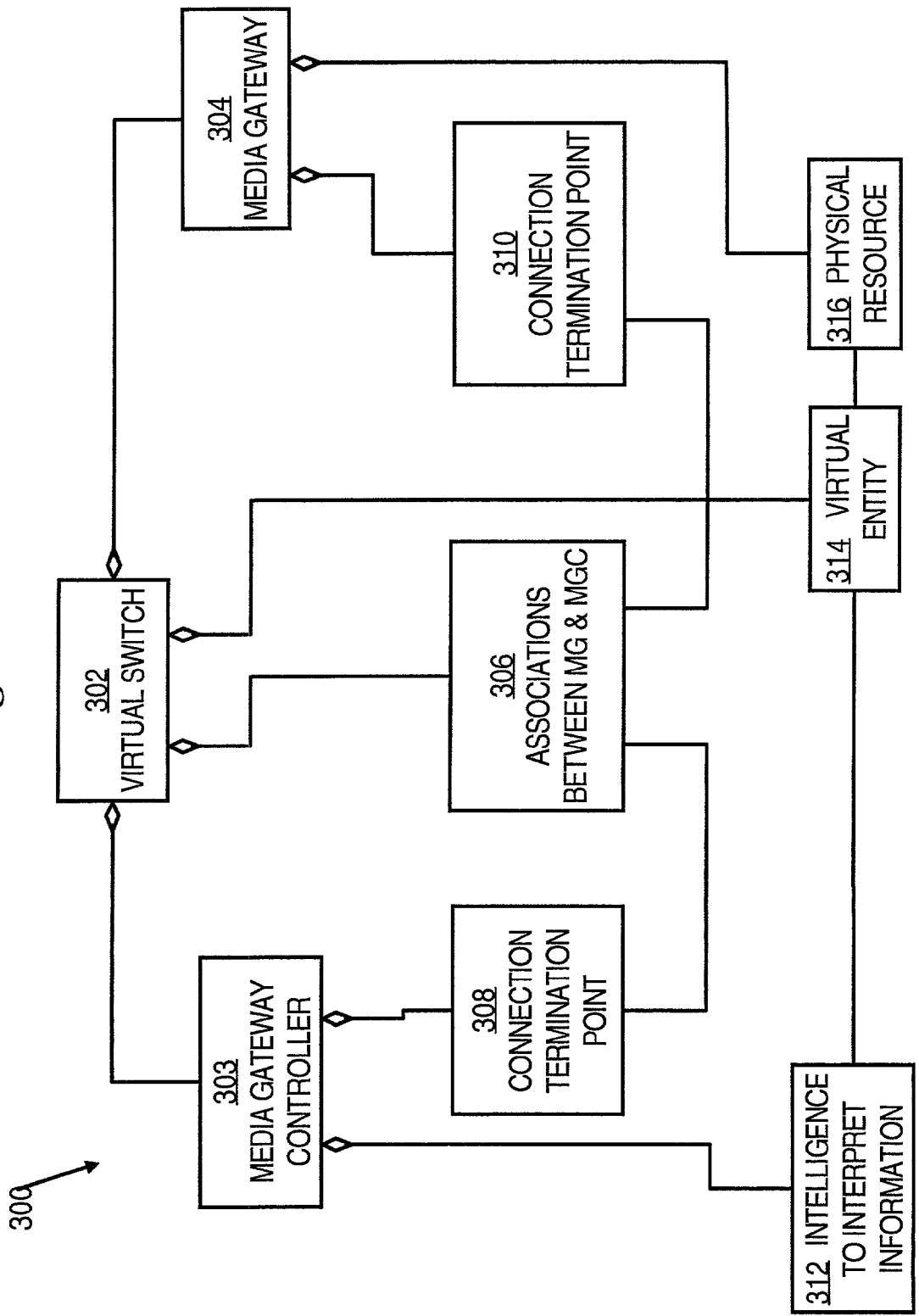
FIG. 3 is a block diagram depicting a virtual switch information model, according to one embodiment.

FIG. 3 is a block diagram depicting a virtual switch information model, according to one embodiment. In general, a virtual switch information model 300 includes objects and methods of those objects that the OPT management applications are based on and can use. Thus, one technique for implementing the virtual switch model is to have the objects that comprise the virtual switch model reside at the OPT network management system layer.

Virtual switch information model 300 comprises a virtual switch object 302 that consists of one media gateway controller object 303 and one or more media gateway objects 304. Virtual switch object 302 also may have one or more association objects 306 that represent associations between an MG and an MGC, such as a control connection, backhaul connection, etc. Virtual switch object 302 also may have one or more virtual entity objects 314, which may represent virtual trunks, virtual trunk groups, D-channel trails, etc.

The media gateway controller object 303 may have one or more connection termination point objects 308 that represent, for example, a control connection termination point, a backhaul connection termination point, etc. Media gateway controller object 303 also may have one or more intelligence objects 312 that represent intelligence to interpret information, such as trunk information, trunk group information, IP path information, etc.

The media gateway objects 304 each comprise one or more connection termination point objects 310 that are substantially similar in structure and function to connection termination point objects 308. Media gateway objects 304 further may have one or more physical resource objects 316, which represent DS1 lines, DS0 lines, D-channels, and other physical resources that form a part of a media gateway.

The virtual switch model may include two categories of managed object classes (MOs) comprising one or more virtual switch level managed objects (VS MOs), and one or more media gateway managed objects (MG MOs) and media gateway controller managed objects (MGC MOs) that relate to constituent elements of the virtual switch. In general, these two categories of MOs constitute network-layer abstractions and aggregations, which are built on objects of the element-management layer. Virtual switch MOs are complemented by classes that model the Media Gateways and Media Gateway Controllers (i.e. the MG MOs and MGC MOs). The MGC MOs and the MG MOs are representations of network elements. One aspect of the virtual switch model lies in how the VS MOs tie MG MOs and MGC MOs together to allow management of the virtual switch as a single atomic entity.

The foregoing elements may be implemented in one or more computer programs that have the structure and functions described in pages 33 to 310, inclusive, of the above-referenced Provisional application, to which the reader is directed for further information. In general, according to one specific embodiment illustrated in such information, a virtual switch comprises the following programmatic objects:

(1) Virtual switch managed object: A virtual switch MO is a virtual representation of the following: (a) an MGC, (b) the MGs controlled by the MGC, and (c) the connectivity control between the MGC and the MGs. To an operator the "virtual switch" provides virtual switch operations.

(2) Virtual Trunk: A virtual trunk comprises (a) the physical termination of the trunk at the MG (e.g., the actual DS0 line) as well as (b) knowledge of the trunk by the MGC, which is referred to as the trunk termination control. This "knowledge of the trunk" allows the MGC to control the trunk. To function properly, control communication needs to be working properly, which can be expressed through a configuration state. Thus, the OPT network elements need to be configured properly for control communications to work properly. Configuration state includes information that enables the determination of whether the OPT network elements are configured properly.

(3) Virtual Trunk group: A virtual trunk group constitutes a grouping of virtual trunks for administration purposes. In general, an MG will have no notion of which DS0s are grouped in a virtual trunk group; this concept of virtual trunk groups applies to the MGC for grouping the MGC's trunk termination controls. The concept of a virtual trunk group is a concept associated with a traditional switch, and therefore is a part of the virtual switch. Virtual trunk groups provide a way of administrating and provisioning trunks as a group. For example, instead of setting up 30 trunks separately, the virtual trunk group provides a mechanism for grouping the 30 trunks into a virtual trunk group and configuring the virtual trunk group as a whole, which in turns results in configuring all of the trunks in the trunk group in a manner that the virtual trunk group was configured.

(4) Virtual D-channel: A virtual D-channel is a representation of a physical termination of a D-channel, or the physical DS0 line that carries the D-channel signaling, at the MG, and the termination of the signaling at the MGC. A virtual D-channel is controlled and processed at the MGC. In addition, to be operable a D-channel requires a working backhaul connection. Again, by managing a virtual D-channel, the fact that an MG and MGC portion are associated with the virtual D-channel, and that backhaul connectivity needs to be managed can be hidden from the operator. As with a virtual switch, tracking virtual D-channels for fallout processing is possible. Tracking D-channel fallout processing involves tracking the fallout to the D-channel components associated with the MG, MGC, and backhaul connection. State can be used to identify D-channel problems related to signaling backhaul communications.

The following other objects may be provided in an embodiment, and relate to elements in a traditional network, and therefore are used to support the virtual switch model:

(1) Control connection: represents the MGCP communication, relating the MGCP endpoints on both the MG and the MGC. The control connection object is managed as part of the virtual switch, but can also be viewed independently.

(2) Backhaul connection: represents the communications related to signaling backhaul, using a session manager protocol or SCTP, relating the endpoints on both MG and MGC.

(3) Media Gateway: represents the Media Gateway.

(4) Media Gateway Controller: represents the Media Gateway Controller.

Another embodiment of a virtual switch information model is described in pp. 169–310 of the above-referenced Provisional application. Although the object-oriented programming approach has been used in this discussion the various components comprising the virtual switch may be implemented using non-object-oriented programming techniques.

Virtual Switch Operations

According to one embodiment, a virtual switch encapsulates many real resources (such as MGCs and MGs) and actions (communications between the MGCs and MGs) that operators are currently required to perform on these real resources. As a result, the OPT network operator (or any applications that may use the virtual switch) is not required to carry out the kinds of complex steps required in managing individual elements in an OPT network. Instead, an operator can think in terms of virtual switch operations. Thus the virtual switch in conjunction with these virtual switch operations provides a simplified mechanism for the operator to manage the real resources that comprise the OPT network. By using the virtual switch operations, the operator triggers an underlying application to perform complex management tasks on behalf of the operator.

Examples of virtual switch operations are as follows: (1) associate/disassociate an MG from a virtual switch, (2) add/remove/modify parameters of a PRI backhaul service, (3) add/remove/modify a trunk, a trunk group, routes, route lists, (4) add/remove/modify a customer, (5) turn up/tear down/modify service for a customer. Each such operation is provided as a single operation, hiding from the user the underlying operational complexity of having to deal with multiple operations across multiple network elements.

In one embodiment implemented using object oriented programming, virtual switch operations are provided as methods on the objects comprising the virtual switch. Internally, each virtual switch operation is decomposed into a series of steps necessary to achieve the desired effect.

Figure 4:
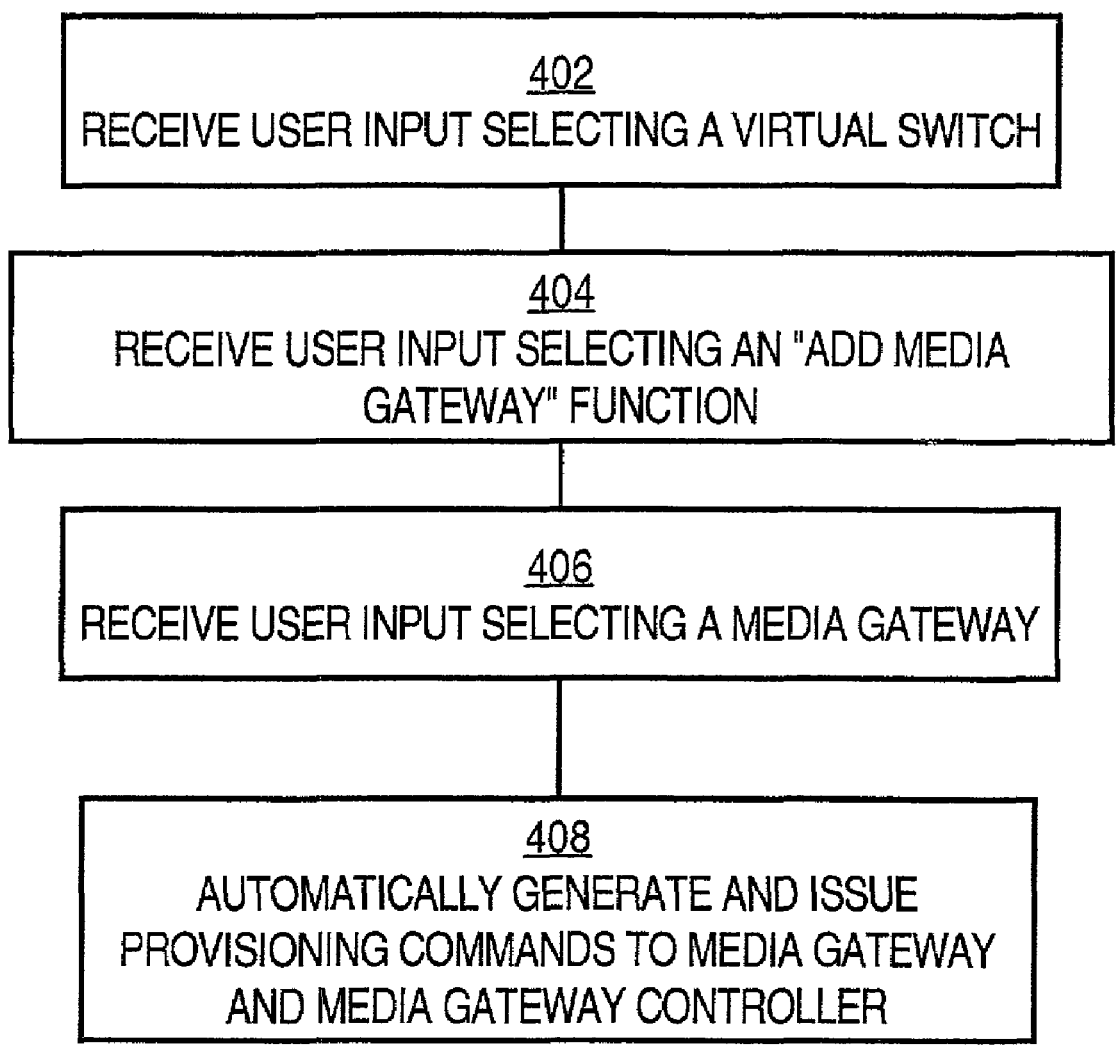
FIG. 4 is a flow diagram illustrating an example process in which an operator uses a virtual switch to associate a media gateway with a media gateway controller to result in offering PRI services.

FIG. 4 is a flow diagram illustrating an example process in which an operator uses a virtual switch to associate a media gateway with a media gateway control to result in offering PRI services.

In block 402, user input selecting a virtual switch is received. For example, a GUI of OPT network management system 210 receives input from a mouse or other cursor movement device that selects a particular virtual switch object that is graphically represented in a network topology display. In block 404, user input selecting an "Add Media Gateway" function is received. For example, input selecting an "Add Media Gateway" function from a toolbar or pull-down menu of the GUI is received. In block 406, user input selecting a media gateway is received. The user input selects or identifies a media gateway object that is graphically illustrated in the network topology display or listed in an inventory list.

In block 408, provisioning commands are automatically generated and issued to the actual media gateway represented by the media gateway object that was selected in block 406 and to an associated media gateway. Thus, as a result of the operator performing the above steps of block 402–406, OPT network management system 212 automatically sets up MGCP connections on both the MG end and the MGC end, signaling backhaul, etc. The operator does not have to be aware of the system's actions that are taking place under the covers. Removal and configuration modifications work analogously to this example of adding PRI service to a customer.

Block 408 necessarily involves numerous provisioning sub-steps that are omitted from FIG. 4 for the purpose of illustrating a high-level view of the overall process. In an embodiment, most voice services and features that are the subject of operations of block 408 will involve coordinated provisioning of multiple network elements. For example, block 408 may involve setting line parameters on the media gateway controller, setting inter-connection parameters between them, and establishing end-to-end connection management parameters within the network. As a specific example, for turning up PRI service for a customer, block 408 may cause OPT network management system 212 to take the following actions:

1. Set up a MGCP control association; this will involve adding MGCP terminations at both the media gateway and media gateway controller;

2. Add a line with TDM endpoints and a CCS channel on the selected media gateway;

3. Instruct the media gateway controller to add a new trunk group and associate it with the customer;

4. Instruct the media gateway controller to add the trunks;

5. Associate the trunks with the corresponding media gateway endpoint;

6. Verify a signaling backhaul connection has been set up, which may involve separately verifying a primary backhaul connection and a secondary backhaul connection;

7. Set up a signaling backhaul connection if required; this may involve adding signaling backhaul terminations at both the media gateway and media gateway controller, and may involve setup of a Layer 2 connection to carry the signaling backhaul connection, such as a permanent virtual circuit in an ATM switch;

8. Set up a cross-connect between the CCS channel and the signaling backhaul connection at the media gateway, if required, as determined by the type of media gateway.

Different network solutions may have different configuration rules for virtual switches. For example, the selected control protocol may differ, or the solution may apply to VoAAL1, VoAAL2, or VoIP. Similarly, if the MG and MGC are interconnected using ATM switches, an operator may need to pre-establish PVPs or PVCs to interconnect MGs controlled by the same MGC.

Figure 5A:
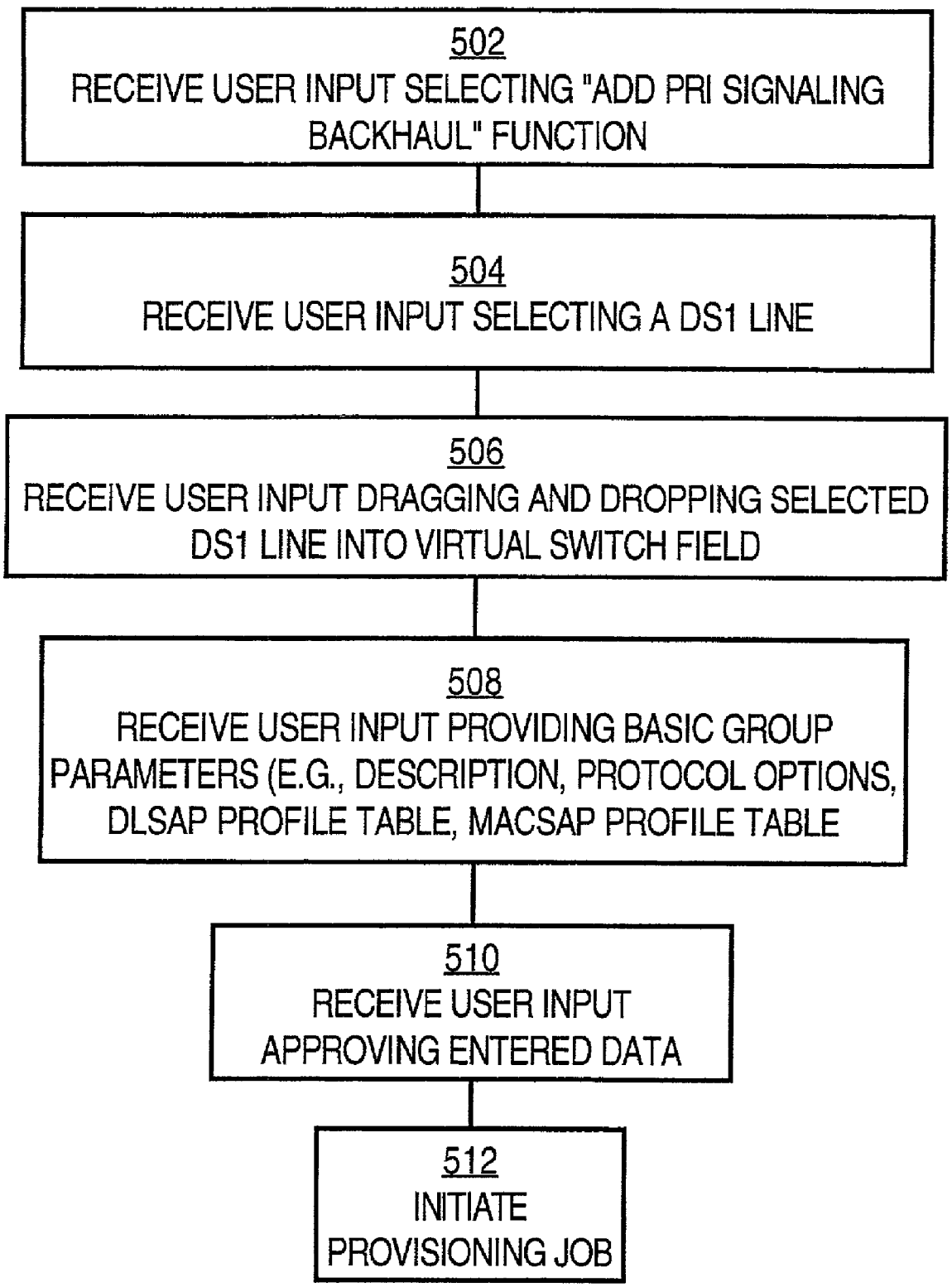
FIG. 5A is a flow diagram of a process of adding a PRI signaling backhaul connection to a virtual switch.

FIG. 5A is a flow diagram of a process of adding a PRI signaling backhaul connection to a virtual switch. In block 502, user input selecting an "Add PRI signaling backhaul" function is received. For example, when OPT network management system 212 provides a graphical user input, block 502 may involve receiving user input that selects a PRI Signaling Backhaul tab and an Add function. In block 504, user input selecting a DS1 line is received. For example, a DS1 in a tree view of the GUI of OPT network management system 212 is selected. For proper operation, the selected DS1 line must have a pre-configured D channel. In block 506, user input dragging and dropping the selected DS1 line into a virtual switch field is received.

In block 508, user input providing basic group parameters is received. In one embodiment, a user selects a Basic Group Parameters tab and enters appropriate values, such as Description, Protocol Options, DLSAP profile table, MAC-SAP profile table, etc. Detailed values for signaling parameters also may be provided.

In block 510, user input approving the previously entered data values is received. Such input may comprise selecting an "OK" button, "SUBMIT" button, etc. In block 512, a provisioning job is initiated to provision the virtual switch and its constituent components as necessary to add a PRI signaling backhaul connection as specified by the user.

Figure 5B:
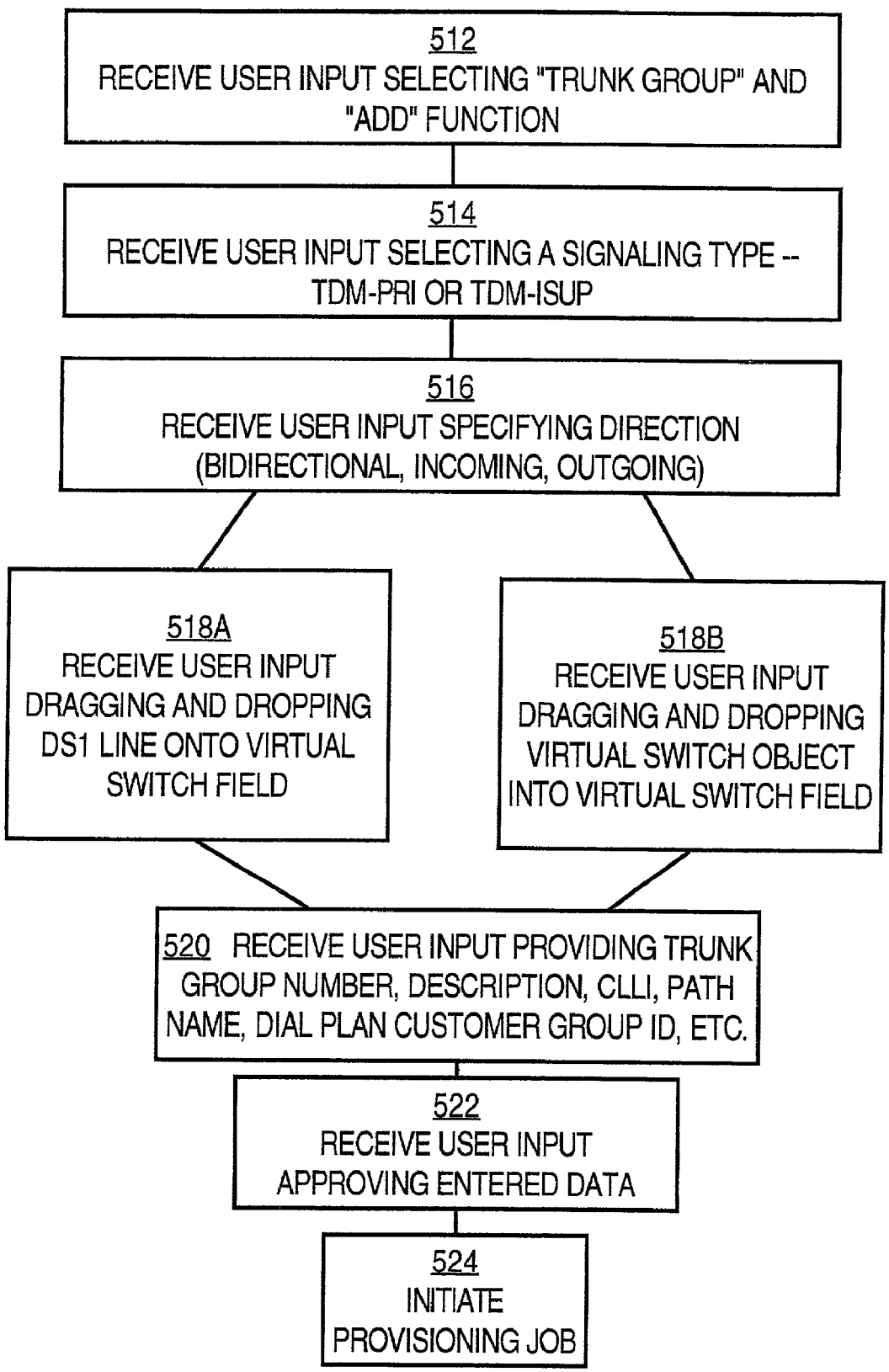
FIG. 5B is a flow diagram of a process of adding a trunk group to a virtual switch.

FIG. 5B is a flow diagram of a process of adding a trunk group to a virtual switch. A trunk group is a logical grouping of trunks that exist in an MGC node. Trunk groups are used to associate incoming trunks with a dial plan and associate outgoing trunks with route lists. For different signaling types, the trunk group has different signaling associations. For example, for the TDM-PRI signaling type, the trunk group is associated with one and only one PRI backhaul connection. For the FAS signaling type, the trunk group is associated with one DS1. For the NFAS signaling type, the trunk group is associated with multiple DS1s. For the TDM-ISUP signaling type, all trunks in a trunk group have one destination point code (DPC).

In block 512, user input selecting a Trunk Group function area and Add function is received. For example, a user may select a Trunk Group tab and an Add function within the tab. In block 514, user input selecting a signaling type is received; the signaling type may be TDM-PRI or TDM-ISUP. User input specifying a direction, selected from among Bi-directional, Incoming, or Outgoing, is received in block 516.

If PRI was selected as the Signaling Type, then in block 518A, user input dragging and dropping a DS1 line onto a virtual switch field is received. Alternatively, if ISUP was selected as the Signaling Type, then in block 518B, user input dragging and dropping a virtual switch object into the virtual switch field is received. This operation selects a particular virtual switch in the network that will be the subject of processing.

In block 520, user input providing basic group parameter values is received. The basic group parameter values may include a trunk group number, description, etc., as indicated in block 520. In block 522, user input approving the entered data is received, and in block 524, a provisioning job is initiated. The provisioning job adds a trunk group to the MG and MGC that comprise the selected virtual switch.

Figure 5C:
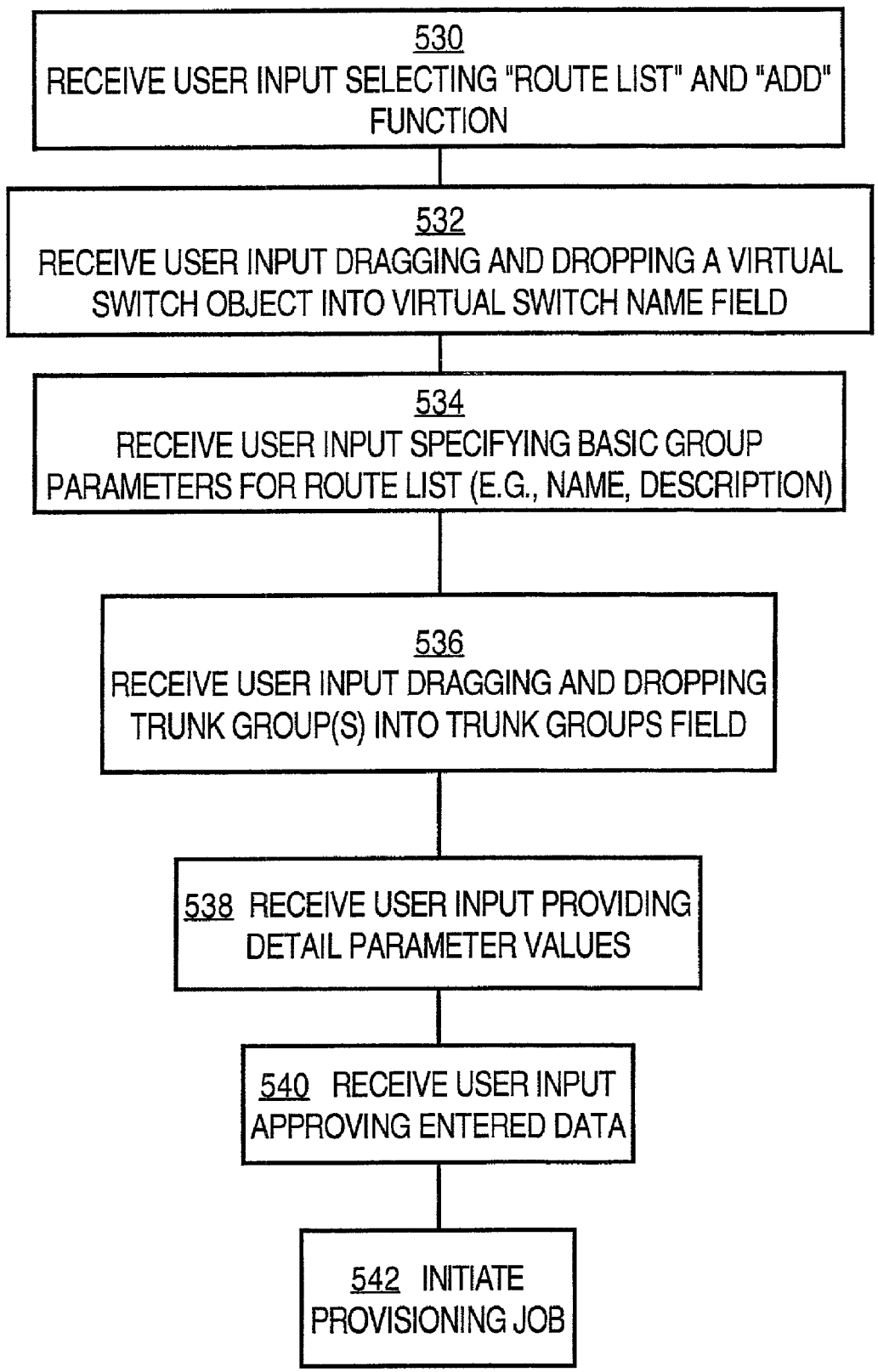
FIG. 5C is a flow diagram of a process of adding a route list to a virtual switch.

FIG. 5C is a flow diagram of a process of adding a route list to a virtual switch. In block 530, user input selecting a Route List function area and Add function is received. For example, a user may select a Route List tab from the GUI of OPT network management system 212 and then select an Add function. In block 532, user input dragging and dropping a virtual switch object into a virtual switch name field of the GUI is received. This operation selects a particular virtual switch in the network that will be the subject of route list processing. User input specifying basic group parameters for the route list, such as a name and description, are received in block 534.

In block 536, user input dragging and dropping one or more trunk groups into a trunk groups field is received. This operation informs the OPT network management application about a proposed association of trunk groups to the selected virtual switch. In block 538, user input providing detailed parameter values is received. This operation enables a user to provided more detailed values for each selected trunk group. In block 540, user input approving the previously entered values is received, and in block 542 a provisioning job is initiated to actually associate the designated trunk groups with constituent elements of the virtual switch in the network.

Figure 5D:
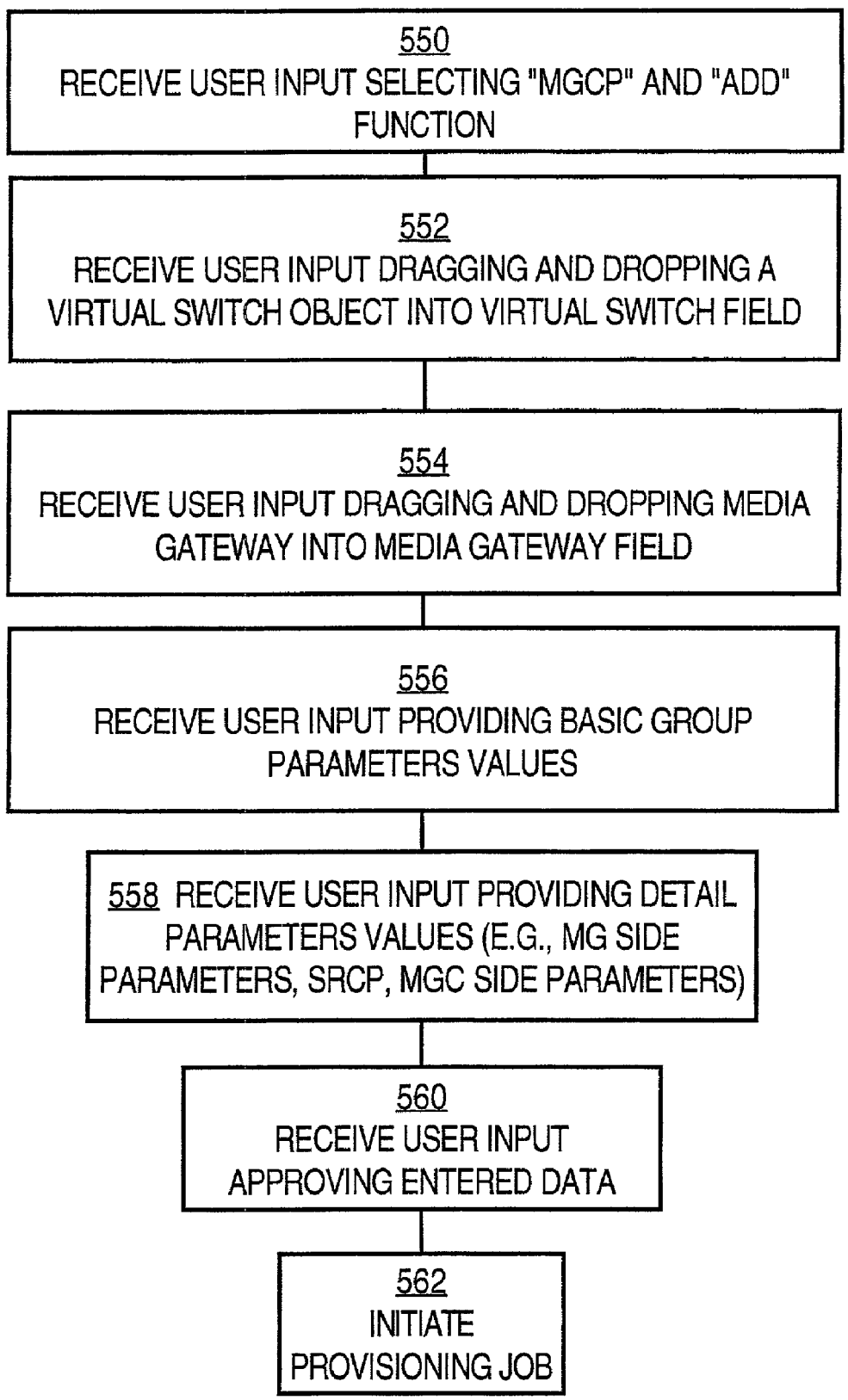
FIG. 5D is a flow diagram of a process of adding a media gateway association to a virtual switch.

FIG. 5D is a flow diagram of a process of adding a media gateway protocol (MGCP) association to a virtual switch. In block 550, user input selecting an MGCP function area and an Add function is received. For example, a user may select an MGCP tab of the GUI of OPT network management system 212. In block 552, user input dragging and dropping a virtual switch object into a virtual switch field is received. This operation identifies a virtual switch that will be the subject of an association. In block 554, user input dragging and dropping a media gateway object into a media gateway field is received. This operation identifies a MG that will participate in an association.

In block 556, user input providing basic group parameter values is received. In block 558, user input providing detailed parameter values, such as MG side parameters, SRCP values, MGC side parameters, etc. In block 560, user input approving the previously entered values is received. In block 562, a provisioning job is initiated to create an MGCP association between the selected virtual switch and MG.

Figure 6:
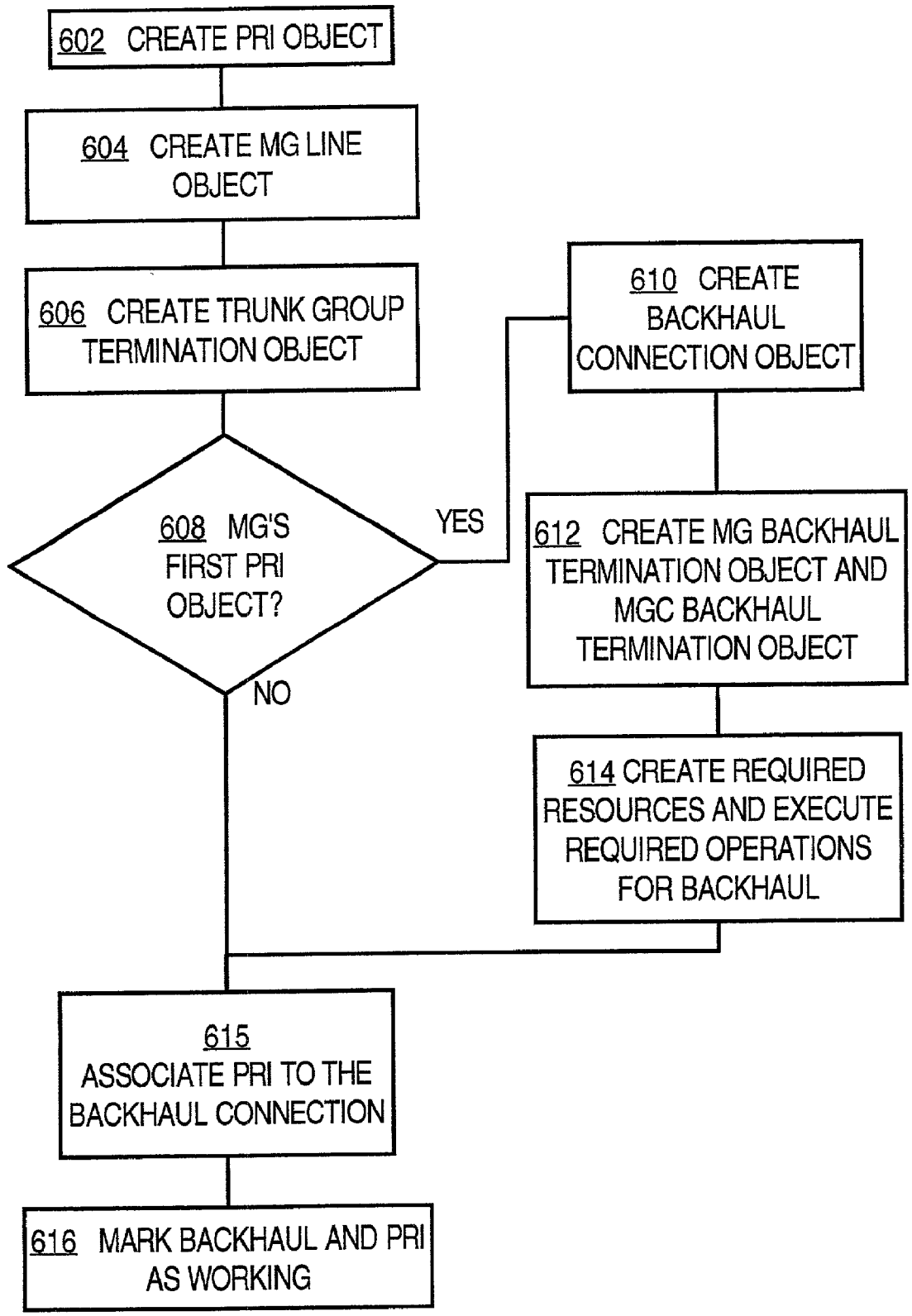
FIG. 6 is a flow diagram of steps that may be carried out in response to a request to create a backhaul connection.

FIG. 6 is a flow diagram of steps that may be carried out in response to a request to create a PRI signaling backhaul connection. In block 602, an object that represents the PRI is created, which depends on other entities such as: (a) a representation of a DS1 line together with its D-Channel signaling from the network that connects to the MG (hereinafter the physical line shall be referred to as the "MG line" and the object that represents this "MG line" shall be referred to as "MG line object") and (b) a representation of the PRI in the form of a D-Channel termination at the MGC (hereinafter referred to as "D-Channel termination object"). As part of PRI object creation, the MG line object and the D-Channel termination object need to be created.

In block 604, an MG line object is created. As part of creating the MG line object, a request is dispatched to the lower-layer system (i.e., the MG or the MG's element management system) to instruct the MG to configure the DS1 line together with its D-Channel signaling on the MG, so the MG line object is associated with the physical MG line that the MG line object presents.

In block 606, a D-Channel signaling termination object 220 is created. As part of creating the D-Channel signaling termination object, a request is dispatched to the lower layer system to instruct the MGC to create a PRI signal path to terminate the D-Channel signaling backhauled from the MG's line that has been added.

In block 608, a test is carried out to determine whether the PRI object created in block 602 is the first PRI object associated with the current MG. If so, then control passes to block 610, in which a backhaul connection object is created.

In block 612, objects that the backhaul connection object depends on are created. The backhaul connection object resulting from block 610 in turn depends on other objects that have to be created, namely the objects that represent the backhaul terminations on both MG and MGC. The object that represents the backhaul termination at the MG is the "MG backhaul termination object" and the object that represents the backhaul termination at the MGC is the "MGC backhaul termination object".

In block 614, one or more required resources are created and one or more operations are executed to support backhaul. Creation of the MG and MGC backhaul termination objects leads to dispatching requests to the lower layer systems to create the required resources and execute the required operations on the actual MG and MGC devices as a part of the creation of the respective objects. For example, protocol endpoints for signaling backhaul based on session manager protocol or SCTP are set up on the actual MG and MGC.

In block 615, the PRI is associated to the backhaul connection. If the backhaul connection already exists, the association of the PRI to the backhaul connection is created. If the backhaul connection doesn't exist, an association to a new backhaul connection is created; the association is required to be created first.

Upon successful creation of the MG and MGC backhaul termination objects the backhaul connection object is marked as working, as shown in block 616. Further, the PRI is marked as working, since all the dependent objects are in place and in working condition.

In an embodiment, fallout processing is provided in the event that a step fails. Further, depending on the actual devices slight differences in the steps of FIG. 6 may be carried out, which the objects and the object mapping to the "real resources" encapsulate.

The virtual switch described herein can be used not only to configuration management tasks but also to flagging inconsistencies in an existing OPT network configuration. Where objects are used to represent OPT network elements and relationships between those elements, flagging OPT network configuration inconsistencies (hereinafter referred to as "inconsistency flagging") can be done by analyzing whether there are mismatches in the dependencies that the objects in the model have with other objects in the model. Inconsistency flagging can be used to relieve many problems for existing OPT operators, where the operator may have introduced an inconsistent configuration. Without inconsistency flagging, an operator does not have a good way of identifying inconsistencies between devices in a configuration.

One technique for quick identification of inconsistencies in the underlying network configuration is to associate one or more state attributes with the various objects that comprise the virtual switch. An example of configuration inconsistency is where an MGC is configured to control a particular MG but that particular MG is not configured to be controlled by that MGC. Inconsistency detection also may be carried out with respect to a virtual entity such as the virtual switch. For example, if the objects that the virtual entity depends on violate one or more integrity constraints, it can be concluded that the virtual switch itself is inconsistent and hence network-level configuration integrity violated. A simple example would be one of the dependent objects not referencing the other where it would be required (for instance, an MG not pointing to the MGC that is supposedly controlling it, e.g. pointing to a different IP address). Similarly, if one of the dependent objects indicates that it is not operational, or not installed, it can be concluded that the virtual entity as a whole is not operational.

Inconsistency detection can occur when the information in the object model is synchronized with the actual information in the network. As part of synchronization, the virtual entity objects may check if the newly synchronized information is still consistent. This can be invoked whenever an object that is part of a virtual entity changes (or is synchronized).

OPT Network Management System

An OPT network management system 212 based on a virtual switch object model as disclosed herein may operate in coordination with element management systems 214, 216, 218. For example, the element management systems may be used for management tasks that are unrelated to voice or otherwise element-specific. The element management systems may carry out backup and restore of individual configuration data, downloading of software images, etc. However, an element management system is not required. For example, in environments in which no element management system is available, it is still possible for OPT network management system 212 to reach devices and have them under the scope of the OPT network management system by interfacing to a configuration delivery and retrieval engine, or by interfacing directly to the devices.

OPT network management system 212 may provide a graphical user interface to facilitate user interaction, as described in pp. 33–167 of the above-referenced Provisional application. For example, a particular screen may receive parameters for provisioning a virtual switch. To increase user productivity, basic parameters that must be supplied are treated separately from the rest of the parameters whose configuration by the user is optional and for which the system will provide defaults. Wizard-driven screens can be invoked for the configuration of special parameters.

Many of the provisioning operations of the OPT network management system 212 lead to multiple management requests issued to one or more of the element management systems shown in FIG. 2A. Within OPT network management system 212, such requests may be represented as network management transactions or provisioning jobs. The OPT network management system 212 may comprise a provisioning job manager to provide a reliable way of managing such transactions. An operator may monitor job progress using a Job Listing tab that displays details of a particular job. This allows operators to know the actual status of provisioning at any point in time and to infer, in cases of failures, what went wrong.

Fault management functionality associated with management of a virtual switch includes integrated alarm reporting, de-duplication, correlation, and impact analysis. Examples of when event fault correlation would be used are the network is running and something in the network breaks such as a backhaul connection or someone unplugs a device. Since the OPT network elements are separate entities and each of these separate entities may detect the same error and generate an alarm for this same error, there is a need for correlating duplicate alarms and reducing the duplicate alarms down to one alarm (hereinafter referred to as de-duplication). One technique for providing de-duplication is via the virtual switch because the virtual switch has knowledge of the network elements and therefore can process all of the alarms generated in the network elements in the virtual switch to de-duplicate the alarms.

As a specific example, both MG and MGC will report a control connectivity disruption, even if the component at fault is the port of a switch through which all control communications is carried. In this example, the OPT network management system 212 can de-duplicate the alarm and indicate the loss of control connectivity as well as loss of service on the affected trunks as the impact or symptoms. Alarms received from multiple element management systems are first normalized, by applying consistent component names within the alarms, and sent to a de-duplicating process. Based on pre-defined or user-defined rules, multiple alarms for the same fault are de-duplicated into a single alarm, and displayed in an alarm browser, with information on impacted network elements and service impact.

In one embodiment, event correlation is facilitated using an event browser that is integrated in OPT network management system 212. An example embodiment of an event browser is described in pp. 127–139 of the above-referenced Provisional application. Use of an event browser is not essential to an embodiment, but provides a convenient way to view and evaluate environmental events that relate to OPT network management system 212. Event correlation also may be is facilitated using a log browser that is integrated in OPT network management system 212. An example embodiment of a log browser is described in pp. 140–143 of the above-referenced Provisional application. Use of a log browser is not essential to an embodiment, but provides a convenient way to view and evaluate environmental events that relate to OPT network management system 212.

Performance, accounting, and security management functions may be provided. For example, accounting data is typically collected by the MGC but not maintained at the MG, as all relevant data is conveyed to the MGC as part of control communications, for instance, when tearing down a connection. Accordingly, no correlation of accounting data is required.

In an embodiment, OPT network management system 212 enables a user to manage network elements that are not part of a virtual switch. For example, the network topology display may include "orphaned" MGs that are not associated with or "owned by" an MGC.

Hardware Overview

Figure 7:
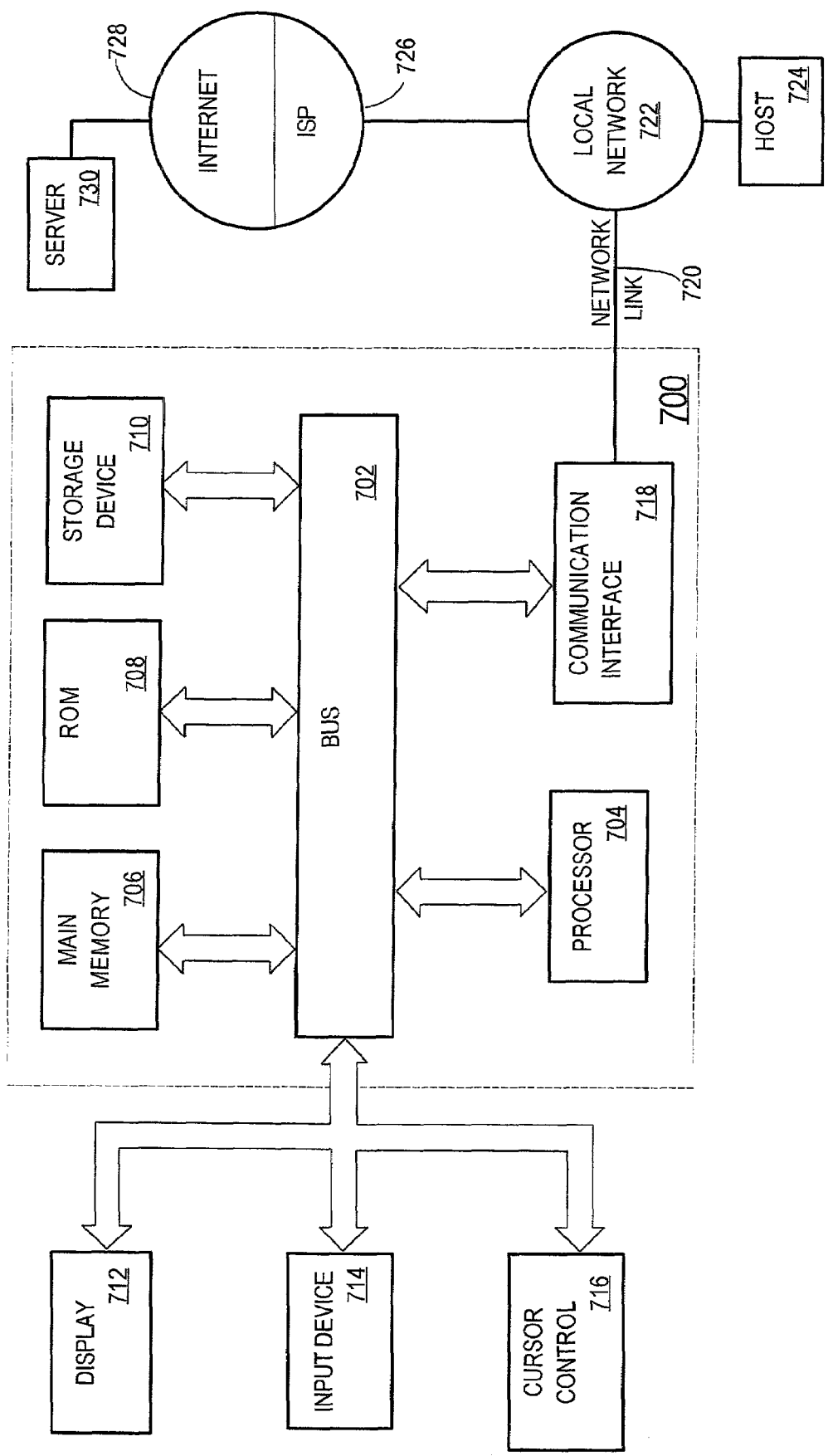
FIG. 7 is a computer system on which an embodiment of the invention may be implemented.

FIG. 7 is a block diagram that illustrates a computer system 700 upon which an embodiment of the invention may be implemented.

Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

Benefits, Extensions and Alternatives

Modeling and driving configuration management applications for an OPT network as if that OPT network consisted of a set of virtual switches offers significant benefits. These benefits include:

(1) Simplifying the way OPT networks can be managed by allowing operators to think in terms of concepts that the operators already know and can easily relate to, and by abstracting management information and operations from multiple places in the network, which leads to more efficient overall network operations.

(2) Allowing easy flagging, or avoiding altogether, of inconsistencies and error conditions in an OPT network configurations results in managing network operations in a less error prone way; therefore decreasing service outages.

(3) Enabling management applications to be built in such a way that OPT management does not result in significant additional operational complexity as compared with TDM management. As a result and contrary to conventional thinking, operational complexity is reduced by using a virtual switch as management of voice and data are combined.

Added benefits of automating management tasks through virtual switch operations include a decrease in errors, and encapsulation of real devices and actions by manipulating real devices and actions through objects that represent these real devices and actions.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing packet voice networks using a virtual switch approach, the method comprising the computer-implemented steps of:

creating and storing a virtual switch object, wherein the virtual switch object is an instantiation of a class and represents a virtual switch, in a packet-switched voice network, having a media gateway controller and one or more associated media gateways, wherein the virtual switch object comprises programmatic objects representing the media gateway controller, the one or more media gateways and associations between the one or more media gateways and the media gateway controller;

receiving user input that specifies a configuration operation on the virtual switch and one or more parameters; and automatically issuing one or more configuration instructions to both the media gateway controller and the media gateway, that cause configuring both the media gateway controller and the media gateway as specified in the user input.

2. A method as recited in claim 1, wherein the virtual switch object is created as part of a network management application computer program, wherein the network management application is communicatively coupled to an operational support system and to one or more element management systems, and further comprising the steps of issuing one or more configuration requests to one or more of the element management systems as part of the step of automatically issuing configuration instructions.

3. A method as recited in claim 1, wherein the virtual switch object is created as part of a network management application computer program that generates a graphical user interface that displays an icon representation of the virtual switch, and wherein the step of receiving user input comprises the step of receiving user input dragging the icon representation and dropping the icon representation in a data entry field.

4. A method as recited in claim 3, further comprising the step of displaying the icon representation in an object holding area of the graphical user interface when the media gateway associated with the object is not then currently associated with a media gateway controller.

5. A method as recited in claim 3, wherein the graphical user interface comprises a tree view of the virtual switch and each media gateway or media gateway controller associated therewith, a topology map of a network topology that includes the virtual switch, and an object holding area that displays un-associated network elements.

6. A method as recited in claim 1, wherein the configuration operation of the step of receiving user input is selected from among the set consisting of: associate/disassociate a media gateway from a virtual switch; add or remove or modify parameters of a primary rate interface (PRI) backhaul service; add or remove or modify a trunk, a trunk group, routes, or route lists; add or remove or modify a customer; or turn up or tear down or modify service for a customer.

7. A method as recited in claim 1, wherein the virtual switch object comprises programmatic objects representing: a media gateway controller; a media gateway; associations between the media gateway and media gateway controller; one or more connection termination points of the media gateway controller and the media gateway; one or more virtual trunks; and one or more physical resources.

8. A method as recited in claim 1,
wherein the user input comprises user input selecting a virtual switch and user input selecting an "Add PRI Signaling Backhaul" function; and
wherein the configuration instructions instruct the media gateway and media gateway controller, as specified, to—
add a line with Time Division Multiplexed (TDM) endpoints and a Common Channel Signaling (CCS) channel on the selected media gateway;
add a New trunk group at the media gateway controller and associate it with a customer;
add one or more trunks at the media gateway controller;
associate the trunks with a corresponding endpoint of the media gateway;
verify that a signaling backhaul connection has been set up;
set up a signaling backhaul connection if required;
set up a cross-connect between the CCS channel and the signaling backhaul connection at the media gateway, if required, as determined by the type of media gateway.

9. A method as recited in claim 1, wherein the virtual switch object is created as part of a network management application computer program that is interfaced to an operational support system, and wherein the step of receiving user input comprises receiving user input from an interface to the operational support system that specifies a configuration operation on the virtual switch and one or more parameter values.

10. An apparatus for managing packet voice networks using a virtual switch approach, comprising:
means for creating and storing a virtual switch object, wherein the virtual switch object is an instantiation of a class and represents a virtual switch, in a packet-switched voice network, having a media gateway controller and one or more associated media gateways, wherein the virtual switch object comprises programmatic objects representing the media gateway controller, the one or more media gateways, and associations between the one or more media gateways and the media gateway controller;
means for receiving user input that specifies a configuration operation on the virtual switch and one or more parameters; and
means for automatically issuing one or more configuration instructions to both the media gateway controller and the media gateway, that cause configuring both the media gateway controller and the media gateway as specified in the user input.

11. An apparatus as recited in claim 10, wherein the virtual switch object is created as part of a network management application computer program, wherein the network management application is communicatively coupled to an operational support system and to one or more element management systems, and further comprising means for issuing one or more configuration requests to one or more of the element management systems as part of the means for automatically issuing configuration instructions.

12. An apparatus as recited in claim 10, wherein the virtual switch object is created as part of a network management application computer program that generates a graphical user interface that displays an icon representation of the virtual switch, and wherein means for receiving user input comprises means for receiving user input dragging the icon representation and dropping the icon representation in a data entry field.

13. An apparatus as recited in claim 12, further comprising means for displaying the icon representation in an object holding area of the graphical user interface when the media gateway associated with the object is not then currently associated with a media gateway controller.

14. An apparatus as recited in claim 12, wherein the graphical user interface comprises a tree view of the virtual switch and each media gateway or media gateway controller associated therewith, a topology map of a network topology that includes the virtual switch, and an object holding area that displays un-associated network elements.

15. An apparatus as recited in claim 10, wherein the configuration operation is selected from among the set consisting of: associate/disassociate a media gateway from a virtual switch; add or remove or modify parameters of a primary rate interface (PRI) backhaul service; add or remove or modify a trunk, a trunk group, routes, or route lists; add or remove or modify a customer; or turn up or tear down or modify service for a customer.

16. An apparatus as recited in claim 10, wherein the virtual switch object comprises programmatic objects representing: a media gateway controller; a media gateway; associations between the media gateway and media gateway controller; one or more connection termination points of the media gateway controller and the media gateway; one or more virtual trunks; and one or more physical resources.

17. An apparatus as recited in claim 10,
wherein the user input comprises user input selecting a virtual switch and user input selecting an "Add PRI Signaling Backhaul" function; and
wherein the configuration instructions instruct the media gateway and media gateway controller, as specified, to—
add a line with Time Division Multiplexed (TDM) endpoints and a Common Channel Signaling (CCS) channel on the selected media gateway;
add a New trunk group at the media gateway controller and associate it with a customer;
add one or more trunks at the media gateway controller;
associate the trunks with a corresponding endpoint of the media gateway;
verify that a signaling backhaul connection has been set up;
set up a signaling backhaul connection if required;

set up a cross-connect between the CCS channel and the signaling backhaul connection at the media gateway, if required, as determined by the type of media gateway.

18. An apparatus as recited in claim 10, wherein the virtual switch object is created as part of a network management application computer program that is interfaced to an operational support system, and wherein means for receiving user input comprises means for receiving user input from an interface to the operational support system that specifies a configuration operation on the virtual switch and one or more parameter values.

\* \* \* \* \*

UNITED STATES PATENT AND TRADEMARK OFFICE
CERTIFICATE OF CORRECTION

PATENT NO. : 7,126,941 B1
APPLICATION NO. : 10/027005
DATED : October 24, 2006
INVENTOR(S) : L. Alexander Clemm It is certified that error appears in the above-identified patent and that said Letters Patent is hereby corrected as shown below:

COLUMN 20

Claim 1: Line 32, delete "gateways" and insert --gateways,--.

Signed and Sealed this

Second Day of January, 2007

JON W. DUDAS
*Director of the United States Patent and Trademark Office*